(12) United States Patent
Yamashita et al.

(10) Patent No.: US 12,222,574 B2
(45) Date of Patent: Feb. 11, 2025

(54) OPTICAL FIBER UNIT AND OPTICAL FIBER UNIT MANUFACTURING METHOD

(71) Applicant: Fujikura Ltd., Tokyo (JP)

(72) Inventors: Noriaki Yamashita, Sakura (JP); Akira Namazue, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 18/012,371

(22) PCT Filed: Jun. 22, 2021

(86) PCT No.: PCT/JP2021/023658
§ 371 (c)(1),
(2) Date: Dec. 22, 2022

(87) PCT Pub. No.: WO2022/004498
PCT Pub. Date: Jan. 6, 2022

(65) Prior Publication Data
US 2023/0266556 A1    Aug. 24, 2023

(30) Foreign Application Priority Data
Jul. 1, 2020   (JP) .................................. 2020-114330

(51) Int. Cl.
*G02B 6/44*         (2006.01)

(52) U.S. Cl.
CPC .......... *G02B 6/448* (2013.01); *G02B 6/4482* (2013.01)

(58) Field of Classification Search
CPC ............................. G02B 6/448; G02B 6/4482
(Continued)

(56) References Cited

U.S. PATENT DOCUMENTS

2011/0110635 A1   5/2011  Toge et al.
2018/0314020 A1*  11/2018 Sato ..................... G02B 6/448
(Continued)

FOREIGN PATENT DOCUMENTS

| CN | 100516955 C | 7/2009 |
| EP | 3282295 A1 | 2/2018 |

(Continued)

OTHER PUBLICATIONS

Office Action issued in Taiwanese Application No. 11120623730 ; Dated Jun. 27, 2022 (5 pages).
(Continued)

*Primary Examiner* — Jerry M Blevins
(74) *Attorney, Agent, or Firm* — Osha Bergman Watanabe & Burton LLP

(57) ABSTRACT

An optical fiber unit according to the present disclosure includes a plurality of intermittently-connected optical fiber ribbons. At least one of the optical fiber ribbons includes a plurality of optical fibers including a first optical fiber, and a second optical fiber that is longer than the first optical fiber. Conditions (AA) and c<0.05 are satisfied, where b is an interval, in a length direction, between connection parts that connect the first optical fiber and the second optical fiber, c (%) is a fiber length difference of the second optical fiber with respect to the first optical fiber, and Y is an interval between the optical fibers in a ribbon width direction.
(AA):

$$C > 100 \times \left\{ \sqrt{\left(\frac{2Y}{b}\right)^2 + 1} - 1 \right\}$$

5 Claims, 11 Drawing Sheets

(58) Field of Classification Search
USPC .......................................................... 385/114
See application file for complete search history.

(56) References Cited

U.S. PATENT DOCUMENTS

2018/0321454 A1* 11/2018 Sato ........................ G02B 6/448
2019/0250347 A1   8/2019 Fallahmohammadi et al.
2019/0384000 A1* 12/2019 Tamura .................... G02B 6/44

FOREIGN PATENT DOCUMENTS

| EP | 3633432 A1 | 4/2020 |
|----|------------|--------|
| JP | 2007-233252 A | 9/2007 |
| JP | 2012-208225 A | 10/2012 |
| JP | 2014-211526 A | 11/2014 |
| JP | 2014-228687 A | 12/2014 |
| JP | 2015-52692 A | 3/2015 |

OTHER PUBLICATIONS

International Search Report issued in corresponding International Application No. PCT/JP2021/023658 mailed Sep. 7, 2021 (5 pages).
Written Opinion issued in corresponding International Application No. PCT/JP2021/023658 mailed Sep. 7, 2021 (4 pages).

* cited by examiner

Y=0.25(mm)

| b(mm) | c(%) |
|---|---|
| 10.0 | 0.125 |
| 15.8 | 0.050 |
| 20.0 | 0.031 |
| 30.0 | 0.014 |
| 40.0 | 0.008 |

| b(mm) | c(%) |
|---|---|
| 10.0 | 0.080 |
| 12.7 | 0.050 |
| 20.0 | 0.020 |
| 30.0 | 0.009 |
| 40.0 | 0.005 |

FIG. 9B

OPTICAL FIBER UNIT AND OPTICAL FIBER UNIT MANUFACTURING METHOD

TECHNICAL FIELD

The present invention relates to optical fiber units and optical fiber unit manufacturing methods.

BACKGROUND ART

Techniques are known in the art for constructing an optical fiber cable by bundling a plurality of optical fibers into optical fiber assemblies as optical fiber units. This technique typically involves winding a rough winding string (bundling member) around each bundle of optical fibers, to thereby suppress the optical fiber bundle from falling apart and enable each optical fiber unit to be identified by the color of the bundling member. For example, Patent Literature 1 discloses a technique of forming an optical fiber unit by bundling together a plurality of optical fiber ribbons.

CITATION LIST

Patent Literature

Patent Literature 1: Japanese Patent Application Laid-open Publication No. 2007-233252A

SUMMARY

In cases of constructing an optical fiber unit by bundling a plurality of optical fiber ribbons, the optical fiber ribbons may be bundled in a stacked state (i.e., in a state where the plurality of optical fiber ribbons are superposed on one another), as disclosed in Patent Literature 1. Unfortunately, in cases of constructing an optical cable by using optical fiber units including a plurality of optical fiber ribbons in a stacked state as disclosed in Patent Literature 1, if a load (e.g., bending, temperature change, etc.) is applied to the optical cable, the load may concentrate only on certain optical fibers, which may give rise to an increase in transmission loss.

A primary aspect of the present disclosure relates to an optical fiber unit including a plurality of intermittently-connected optical fiber ribbons. At least one of the plurality of optical fiber ribbons includes a plurality of optical fibers including a first optical fiber, and a second optical fiber that is longer than the first optical fiber.

The following conditions $$C > 100 \times \left\{ \sqrt{\left(\frac{2Y}{b}\right)^2 + 1} - 1 \right\}$$

and
c<0.05 are satisfied, where b is an interval, in a length direction, between connection parts that connect the first optical fiber and the second optical fiber, c (%) is a fiber length difference of the second optical fiber with respect to the first optical fiber, and Y is an interval between the optical fibers in a ribbon width direction.

Other features of the present disclosure will be disclosed in the present Description with reference to the drawings.

Effects

The present disclosure suppresses load from concentrating on certain optical fibers.

BRIEF DESCRIPTION OF DRAWINGS

FIG. 2B is an explanatory diagram of an intermittently-connected optical fiber ribbon 7 including an optical fiber having a fiber length difference.

FIG. 9A is a table showing a relationship between length b and fiber length difference c when fiber pitch Y is 0.25 mm. FIG. 9B is a table showing a relationship between length b and fiber length difference c when fiber pitch Y is 0.20 mm.

DESCRIPTION OF EMBODIMENTS

Figure 1A:
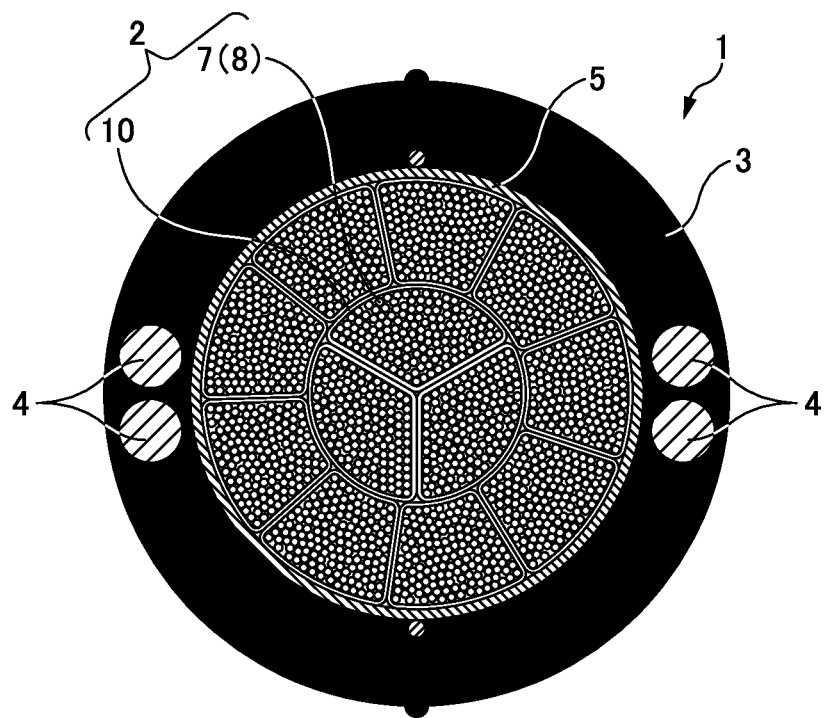
FIG. 1A is an explanatory diagram of an optical cable 1.

At least the following features are disclosed in the Description and Drawings as described below.

Disclosed is an optical fiber unit including a plurality of intermittently-connected optical fiber ribbons. At least one of the plurality of optical fiber ribbons includes a plurality of optical fibers including a first optical fiber, and a second optical fiber that is longer than the first optical fiber. The following conditions $$C > 100 \times \left\{ \sqrt{\left(\frac{2Y}{b}\right)^2 + 1} - 1 \right\}$$

and
c<0.05 are satisfied, where b is an interval, in a length direction, between connection parts that connect the first optical fiber and the second optical fiber, c (%) is a fiber length difference of the second optical fiber with respect to the first optical fiber, and Y is an interval between the optical fibers in a ribbon width direction. With this optical fiber unit, it is possible to suppress load from concentrating on certain optical fibers.

The optical fiber unit may further include a bundling member that bundles the plurality of optical fiber ribbons. In this way, the optical fiber unit can be constructed by bundling the plurality of optical fiber ribbons with the bundling member.

The second optical fiber may be disposed asymmetrically with respect to the ribbon width direction of the optical fiber ribbon. This facilitates assembling of the plurality of optical fiber ribbons in a state where the stacked state is disrupted.

A first optical fiber ribbon and a second optical fiber ribbon may be disposed with respective ribbon surfaces facing one another; and when viewing the first optical fiber ribbon and the second optical fiber ribbon from the length direction, the position, in the ribbon width direction, of the aforementioned second optical fiber in the first optical fiber ribbon is different from the position, in the ribbon width direction, of the aforementioned second optical fiber in the second optical fiber ribbon. This further facilitates assembling of the plurality of optical fiber ribbons in a state where the stacked state is disrupted.

Also disclosed is an optical fiber unit manufacturing method involving: preparing an intermittently-connected optical fiber ribbon that includes a plurality of optical fibers including a first optical fiber and a second optical fiber that is longer than the first optical fiber, wherein the following conditions $$C > 100 \times \left\{ \sqrt{\left(\frac{2Y}{b}\right)^2 + 1} - 1 \right\}$$

and
c<0.05
are satisfied, where b is an interval, in a length direction, between connection parts that connect the first optical fiber and the second optical fiber, c (%) is a fiber length difference of the second optical fiber with respect to the first optical fiber, and Y is an interval between the optical fibers in a ribbon width direction; and assembling a plurality of intermittently-connected optical fiber ribbons including the aforementioned optical fiber ribbon including the aforementioned second optical fiber. With this optical fiber unit manufacturing method, it is possible to suppress load from concentrating on certain optical fibers.

Configuration of Optical Cable 1:

FIG. 1A is an explanatory diagram of an optical cable 1.

The optical cable 1 is a cable that houses optical fibers 8. The optical cable 1 of one or more embodiments is a so-called slot-less optical cable that does not include a slot rod in which grooves (slots) for housing the optical fibers 8 are formed. The optical cable 1 of the one or more embodiments includes a plurality of optical fiber units 2 and an outer sheath 3. It should be noted that, although the optical cable 1 is described as a slot-less optical cable in this example, the optical cable may be a slotted optical cable including a slot rod. The later-described optical fiber unit 2 is, however, particularly effective for use in slot-less optical cables 1.

The optical fiber unit 2 is a structure formed by bundling a plurality of optical fibers 8. The optical cable 1 of the one or more embodiments includes a plurality of optical fiber units 2. The structure of the optical fiber unit 2 will be described in detail further below. The plurality of optical fiber units 2 are housed inside the outer sheath 3 in a state covered by a wrapping tape 5. The optical fiber units 2 may be housed inside the outer sheath 3 in a state twisted in one direction or in an S-Z configuration. Other than the optical fiber units 2, an intervening member may be housed inside the wrapping tape 5. For example, an absorbent material may be housed as an intervening member inside or outside the wrapping tape 5, or both inside and outside the wrapping tape. The wrapping tape 5 may be constituted by a water-absorbent tape. The wrapping tape 5 and/or the intervening member do/does not have to be included. It should be noted that FIG. 1 is a conceptual diagram of the optical cable 1, wherein the plurality of optical fiber units 2 are orderly arranged with regularity, and the boundaries between the optical fiber units 2 are oriented along the circumferential direction or the radial direction. In reality, however, the cross-sectional shape of each optical fiber unit 2 is irregular, and the boundaries between the optical fiber units 2 are curved.

The outer sheath 3 is a member that covers the plurality of optical fiber units 2 (and the wrapping tape 5). The outer cross-sectional shape of the outer sheath 3 is substantially circular. In the one or more embodiments, the wrapping tape 5, which wraps the plurality of optical fiber units 2, is housed inside the outer sheath 3. Tension members 4 are embedded in the outer sheath 3. Other members (e.g., rip cords) aside from the tension members 4 may also be embedded in the outer sheath 3.

Figure 1B:
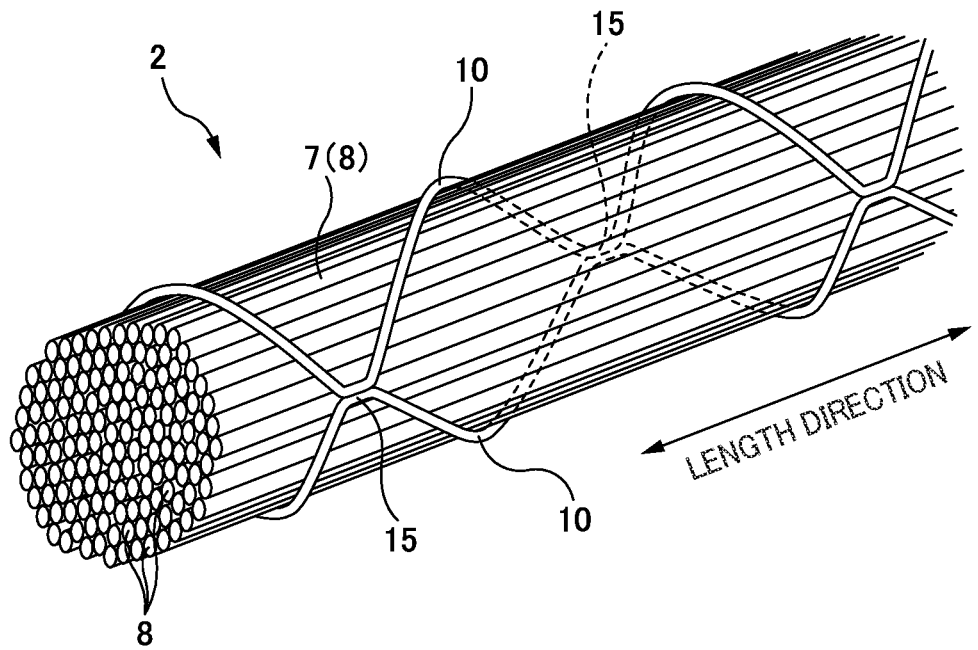
FIG. 1B is an explanatory diagram of an optical fiber unit 2.

FIG. 1B is an explanatory diagram of the optical fiber unit 2.

The optical fiber unit 2 is a structure formed by bundling a plurality of optical fibers 8. In the optical fiber unit 2 of the one or more embodiments, a plurality of optical fibers 8 are bundled by bundling members 10. Note, however, that the optical fiber unit 2 may have a structure wherein the plurality of optical fibers 8 are gathered together, for example, by being twisted together without using a bundling member 10. The bundling members 10 are wound around the outer periphery of the optical fibers 8, and thereby, the optical fibers 8 are bundled and kept from falling apart. The optical fiber unit 2 of the one or more embodiments is constituted by bundling together a plurality of intermittently-connected optical fiber ribbons 7.

Figure 2A:
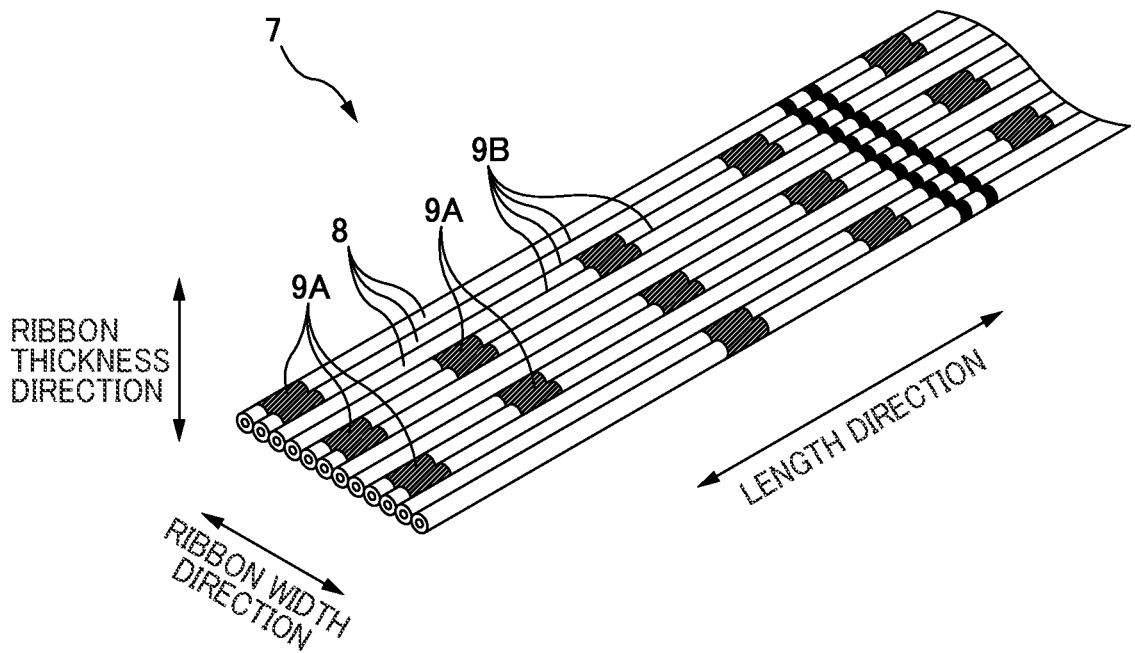
FIGS. 2A and 2B are explanatory diagrams of intermittently-connected optical fiber ribbons 7.
Figure 2B:
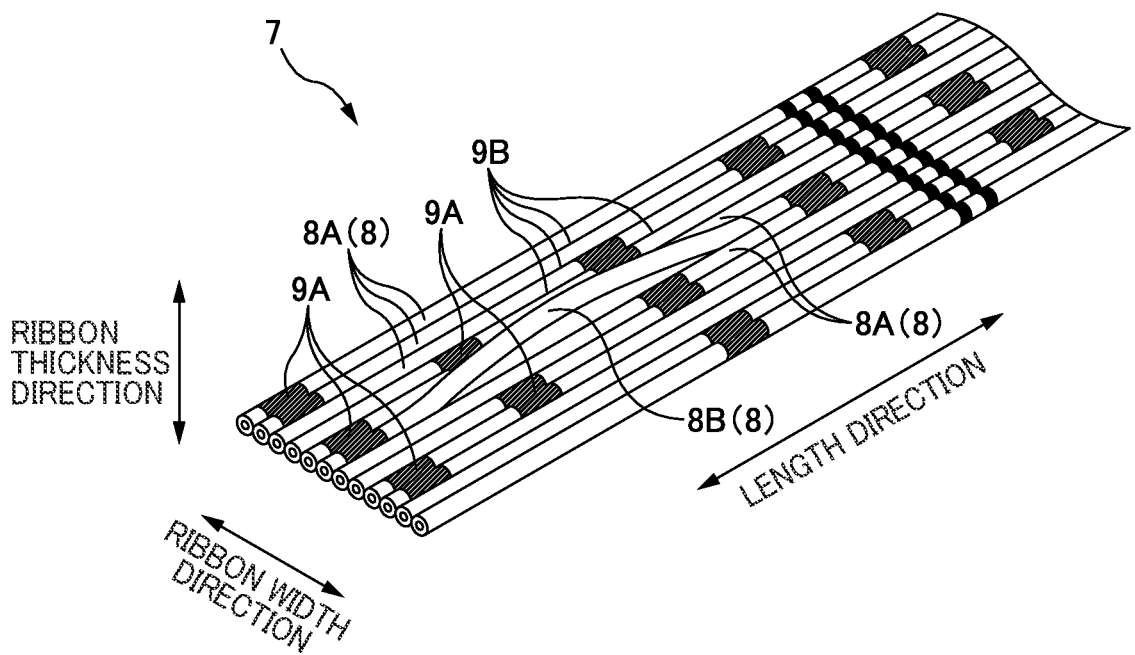

FIGS. 2A and 2B are explanatory diagrams of intermittently-connected optical fiber ribbons 7. In the description below, the direction in which a plurality of optical fibers 8 are lined up may be referred to as "ribbon width direction", whereas the direction perpendicular to both the length direction of the optical fibers 8 and to the ribbon width direction may be referred to as "ribbon thickness direction". A "ribbon surface" of an optical fiber ribbon 7 is oriented in a direction parallel to both the length direction of the optical fibers 8 and the ribbon width direction.

The intermittently-connected optical fiber ribbon 7 is an optical fiber ribbon 7 in which a plurality of (in this example, twelve) optical fibers 8 are lined up in parallel and connected intermittently. Two adjacent optical fibers 8 are connected by connection parts 9A. A plurality of connection parts 9A are disposed intermittently in the length direction between two adjacent optical fibers 8. The connection parts 9A are intermittently disposed two-dimensionally in the length direction and the ribbon width direction. Regions other than where the connection parts 9A are present between two adjacent optical fibers 8 constitute non-connected parts 9B. At the non-connected parts 9B, two adjacent optical fibers 8 are not bound to one another. The optical fiber ribbon 7 can deform flexibly in the ribbon width direction, and a multitude of optical fibers 8 can be bound together at high density.

FIG. 2B is an explanatory diagram of an intermittently-connected optical fiber ribbon 7 including an optical fiber 8B having a fiber length difference. The optical fiber ribbon 7 illustrated in FIG. 2B includes a plurality of optical fibers 8 including: a first optical fiber 8A; and a second optical fiber 8B that is longer than the first optical fiber 8A. The second optical fiber 8B is an optical fiber having a fiber length difference with respect to the first optical fiber 8A. Among the plurality of optical fibers, an optical fiber adjacent to the second optical fiber 8B (i.e., an optical fiber connected to the second optical fiber 8B by means of the connection parts 9A) is referred to as the first optical fiber 8A, but in this example, since the optical fibers other than the second optical fiber 8B all have the same length as the first optical fiber 8A, the optical fibers other than the second optical fiber 8B may be described with the reference sign "8A". It should be noted that the lengths of the optical fibers 8 other than the second optical fiber 8B may be different from one another (described further below). Since the second optical fiber 8B is longer than the first optical fiber 8A, the second optical fiber 8B deforms so as to rise up from the ribbon surface, as illustrated in FIG. 2B.

At least one of the plurality of optical fiber ribbons 7 constituting the optical fiber unit 2 of the one or more embodiments is an intermittently-connected optical fiber ribbon including the aforementioned second optical fiber 8B having a fiber length difference, as illustrated in FIG. 2B. It should be noted that all of the optical fiber ribbons 7 constituting the optical fiber unit 2 of the one or more embodiments may be intermittently-connected optical fiber ribbons each including the aforementioned second optical fiber 8B as illustrated in FIG. 2B.

The intermittently-connected optical fiber ribbon 7 is not limited to the example illustrated in the figure. For example, the arrangement of the connection parts 9A may be changed (described further below; see FIGS. 5A to 5D). The number of optical fibers 8 constituting the intermittently-connected optical fiber ribbon 7 may also be changed. The number of second optical fibers is not limited to one, and there may be two or more second optical fibers. Further, as described further below, a plurality of (e.g., two) adjacent optical fibers may be grouped in a set, and a plurality of sets may be lined up in parallel, and adjacent optical fibers 8 in adjacent sets may be connected intermittently by connection parts 9A (see FIG. 7C). The arrangement pattern of the intermittently-arranged connection parts 9A does not have to be a regular pattern.

The bundling member 10 is a member for bundling a plurality of optical fibers 8. The bundling member 10 is a member capable of binding a plurality of optical fibers 8 together, and is, for example, a thread-shaped, string-shaped, or tape-shaped member. The bundling member 10 is wound around the outer periphery of the bundle of optical fibers 8. In the optical fiber unit 2 illustrated in the figure, two bundling members 10 are used to bundle the optical fibers 8, but instead, the optical fiber unit 2 may include only one bundling member 10, or more than two bundling members. Alternatively, the optical fiber unit 2 does not have to include a bundling member 10.

Each bundling member 10 is constituted by a composite material including a high-melting-point material and a low-melting-point material. The bundling members are fusion-bonded at their intersection points. Note, however, that the bundling member 10 does not have to be a composite material, but instead be constituted by a single material. For example, each bundling member may be constituted by either a high-melting-point material or a low-melting-point material, or the two bundling members 10 may be made from different materials. Alternatively, instead of fusion-bonding the bundling members 10, the bundling members may be joined together by an adhesive. Alternatively, the intersection points between the bundling members 10 do not have to be joined together.

As illustrated in FIG. 1B, the two bundling members 10 are wound around the bundle of optical fibers 8 in an S-Z configuration. More specifically, each bundling member 10 is wound around half the outer periphery of the bundle of optical fibers 8 while reversing the winding direction at joining parts 15. Note, however, that the method for winding the bundling members 10 is not limited thereto. For example, a single bundling member 10 may be wound helically around the outer periphery of the bundle of optical fibers 8. Alternatively, two bundling members 10 may be wound helically in opposite directions from one another around the outer periphery of the bundle of optical fibers 8. In the one or more embodiments, the optical fiber unit 2 is constituted by bundling a plurality of optical fiber ribbons 7 with two string-shaped bundling members 10, but the configuration of the optical fiber unit 2 is not limited thereto. For example, the optical fiber unit 2 may be constituted by wrapping a tape-shaped bundling member 10 onto the outer periphery of the bundle of optical fibers 8. For example, the bundling member 10 may be constituted by a wrapping tape. Alternatively, the bundling member 10 may be constituted by a tube, such as a loose tube, a tight-buffered tube, etc. The bundling members 10 are attached so as to conform to the outer shape of the bundle of optical fibers 8; thus, the outer shape of the bundle of optical fibers 8 can be retained. (As a result, it is possible to retain the optical fiber ribbons 7 in a state where their stacked state has been disrupted (described further below).)

Figure 3:
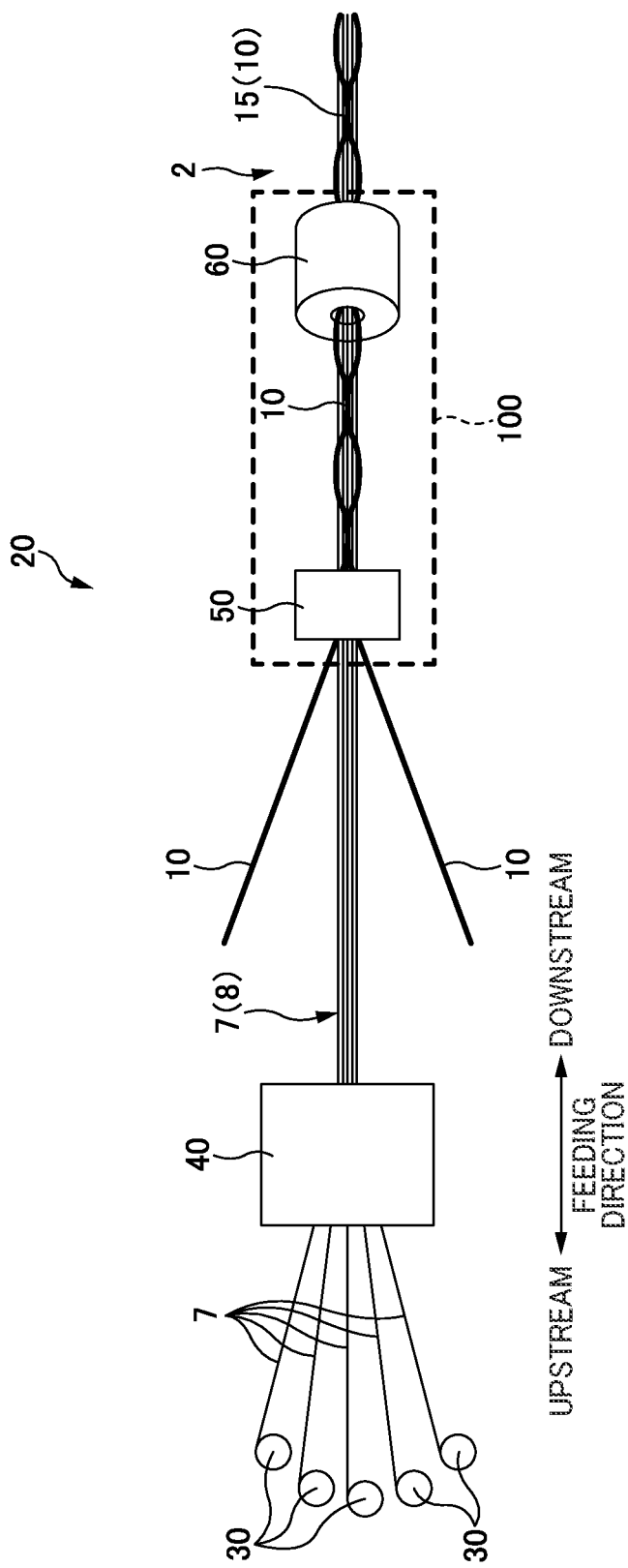
FIG. 3 is an explanatory diagram of a unit manufacturing device 20 for manufacturing an optical fiber unit 2.

FIG. 3 is an explanatory diagram of a unit manufacturing device 20 for manufacturing an optical fiber unit 2.

The unit manufacturing device 20 includes a plurality of ribbon supplying parts 30, an assembling part 40, and a unit forming part 100.

Each ribbon supplying part 30 is a device (supply source) for supplying an intermittently-connected optical fiber ribbon 7. For example, the ribbon supplying part 30 is constituted by a drum (or a bobbin) on which an intermittently-connected optical fiber ribbon 7 is wound in advance. The ribbon supplying part 30 may be constituted by a device for manufacturing an intermittently-connected optical fiber ribbon 7. In the one or more embodiments, a plurality of intermittently-connected optical fiber ribbons 7 are supplied respectively from the plurality of ribbon supplying parts 30 to the assembling part 40. In the one or more embodiments, at least one ribbon supplying part 30 supplies, to the assembling part 40, the intermittently-connected optical fiber ribbon 7 including the aforementioned second optical fiber 8B as illustrated in FIG. 2B.

The assembling part 40 is a device for assembling a plurality of optical fiber ribbons 7. As described further below, the assembling part 40 of the one or more embodiments assembles the plurality of optical fiber ribbons 7 in a state where their stacked state has been disrupted. In the one or more embodiments, the plurality of intermittently-connected optical fiber ribbons 7, in a state where their stacked state has been disrupted, will be supplied from the assembling part 40 to a bundling member attachment part 50.

The unit forming part 100 is a device for forming an optical fiber unit 2 in which a plurality of optical fiber ribbons 7 are bundled by bundling members 10. In the unit forming part 100 of the one or more embodiments, the bundling members 10 are wound around the plurality of optical fiber ribbons 7 in a state where their stacked state has been disrupted, thereby forming an optical fiber unit 2 constituted by optical fiber ribbons 7 in a state where their stacked state has been disrupted. "Optical fiber ribbons 7 in a state where their stacked state has been disrupted" will be described further below. The unit forming part 100 includes a bundling member attachment part 50 and a bundling member joining part 60. Note, however, that in cases where the bundling members 10 are not joined, the unit forming part 100 only needs to include the bundling member attachment part 50, and not the bundling member joining part 60.

The bundling member attachment part 50 is a device for attaching bundling members 10 to the outer periphery of the bundle of intermittently-connected optical fiber ribbons 7. In the one or more embodiments, the bundling member attachment part 50 winds two bundling members 10 in an S-Z configuration. Note, however, that the bundling member attachment part 50 is not limited to a device that winds the bundling members 10 in an S-Z configuration, and may, for example, wind the bundling member(s) 10 helically in one direction. In cases where the bundling member is a tape, the bundling member attachment part 50 may wind the bundling member so as to wrap the bundle of optical fiber ribbons 7. In cases where the bundling member is a tube, a resin forming the tube may be extruded onto the outer periphery of the bundle of optical fiber ribbons 7. In this example, the bundling member attachment part 50 winds two bundling members 10 in an S-Z configuration around the outer periphery of the bundle of optical fiber ribbons 7 and thereby forms intersection points between the two bundling members 10 on the outer periphery of the bundle of optical fiber ribbons 7, and while doing so, supplies the intermittently-connected optical fiber ribbons 7 and the bundling members 10 to the bundling member joining part 60. In FIG. 3, a plurality of intersection points between the bundling members 10 are formed between the bundling member attachment part 50 and the bundling member joining part 60, but instead, the distance between the bundling member attachment part 50 and the bundling member joining part 60 may be shorter than the interval, in the length direction, between intersection points of the bundling members 10.

The bundling member joining part 60 is a device for joining the bundling members 10. The bundling member joining part 60 of the one or more embodiments is constituted by a tubular heater. The inner wall surface of the tubular heater constitutes a heating surface. As the intermittently-connected optical fiber ribbons 7 and the bundling members 10 pass through the interior of the tubular heater, the intersection points between the two bundling members 10 are fusion-bonded and joined together, thus forming joining parts 15. In this way, the optical fiber unit 2 illustrated in FIG. 1B is manufactured. Note, however, that the bundling member joining part 60 may join the bundling members 10 with an adhesive, instead of joining the bundling members 10 by fusion-bonding. Alternatively, the unit forming part 100 does not have to include the bundling member joining part 60, and the bundling members 10 do not have to be joined together.

An optical cable 1 is then manufactured by bundling a plurality of such optical fiber units 2 manufactured as above, wrapping a wrapping tape 5 around the bundle, and then extruding a molten resin, which becomes an outer sheath 3, onto the outside of the wrapping tape 5 in an extruder.

Cross-Sectional Shape of Optical Fiber Unit 2:

First, a cross-sectional shape of an optical fiber unit according to a comparative example will be described. Then, a cross-sectional shape of the optical fiber unit 2 according to the one or more embodiments will be described.

Figure 4A:
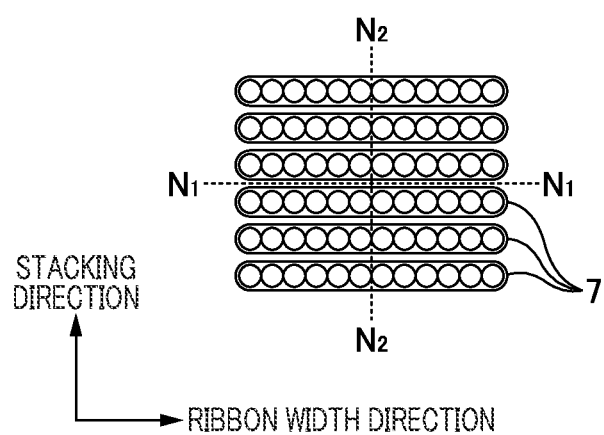
FIG. 4A is an explanatory diagram of a cross-sectional shape of a plurality of optical fiber ribbons 7 according to a comparative example.

FIG. 4A is an explanatory diagram of a cross-sectional shape of a plurality of optical fiber ribbons 7 in an optical fiber unit 2 according to a comparative example. In the comparative example, six intermittently-connected optical fiber ribbons 7 are bundled by bundling members 10 (not illustrated in FIG. 4A) in a stacked state. In the comparative example, the optical fiber ribbons 7 are not bent with respect to the ribbon width direction, and their ribbon surface is flat. Further, the flat ribbon surfaces of the respective optical fiber ribbons 7 are parallel to one another, and the ribbon surfaces of the respective optical fiber ribbons 7 are aligned. Stated differently, in the comparative example, the six optical fiber ribbons 7 are stacked regularly.

In the comparative example illustrated in FIG. 4A, load may concentrate on certain optical fibers 8 when the optical cable gets bent. For example, let us assume that the optical fiber unit 2 is bent in a state where the N1-N1 plane in the figure is the neutral plane. In this case, tensile stress or compressive stress will concentrate on the optical fibers 8 constituting the first optical fiber ribbon 7 or the sixth optical fiber ribbon 7 in the figure (i.e., the optical fiber ribbons 7 located at both ends in the stacked state), and the stress is less likely to be distributed to the other optical fibers 8. Alternatively, let us assume that the optical fiber unit 2 is bent in a state where the N2-N2 plane of each optical fiber ribbon 7 in the figure is the neutral plane. In this case, tensile stress or compressive stress will concentrate on the first fiber or the twelfth fiber in the figure (i.e., the optical fibers 8 located at both ends of each optical fiber ribbon 7), and the stress is less likely to be distributed to the other optical fibers 8. In such circumstances in which the load concentrates on certain optical fibers 8 while making it difficult to distribute the load to other optical fibers 8, there will be an increase in transmission loss at the optical fibers 8 with concentrated load, thus increasing maximum transmission loss (i.e., the greatest transmission loss among transmission losses of the respective optical fibers 8). Hence, load may not concentrate on certain optical fibers 8.

Figure 4B:
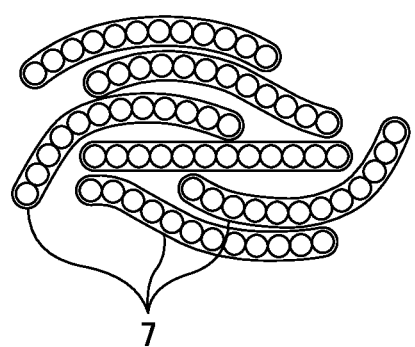
FIG. 4B is an explanatory diagram of a cross-sectional shape of a plurality of intermittently-connected optical fiber ribbons 7 according to the one or more embodiments, in a state where their stacked state has been disrupted.

FIG. 4B is an explanatory diagram of a cross-sectional shape of a plurality of intermittently-connected optical fiber ribbons 7 according to the one or more embodiments. As illustrated in FIG. 4B, in the one or more embodiments, a plurality of optical fiber ribbons 7 constitute an optical fiber unit 2 in a state where their stacked state has been disrupted. In this way, it is possible to suppress load from concentrating on certain optical fibers 8, and thus suppress the maximum transmission loss of the optical cable 1 (or the optical fiber unit 2). Note that "a state where their stacked state has been disrupted" refers to a state in which the relative positional relationship of at least one optical fiber ribbon 7 is different compared to the stacked state illustrated in FIG. 4A. Hence, in the one or more embodiments, the positions of all of the optical fiber ribbons 7 do not necessarily have to be different from the stacked state illustrated in FIG. 4A, and for example, as illustrated in FIG. 4B, a certain optical fiber ribbon 7 may be in the same position with respect to the stacked state illustrated in FIG. 4A. (It will suffice if the other optical fiber ribbons 7 are in different positions compared to the stacked state illustrated in FIG. 4A.) By making the relative positional relationship of at least one optical fiber ribbon 7 different from the stacked state illustrated in FIG. 4A, it is possible to suppress load from concentrating on certain optical fibers 8 compared to the case illustrated in FIG. 4A, and thus suppress the maximum transmission loss of the optical cable 1 (or the optical fiber unit 2).

In the one or more embodiments, at least one ribbon supplying part 30 supplies, to the assembling part 40, an intermittently-connected optical fiber ribbon 7 including the aforementioned second optical fiber 8B as illustrated in FIG. 2B. Further, the assembling part assembles a plurality of intermittently-connected optical fiber ribbons 7 including the intermittently-connected optical fiber ribbon 7 as illustrated in FIG. 2B. As illustrated in FIG. 2B, since the second optical fiber 8B is longer than the first optical fiber 8A, the second optical fiber 8B deforms so as to rise up from the ribbon surface constituted by the first optical fibers 8A. Hence, the second optical fiber 8B disrupts the posture of the other optical fiber ribbons 7, and as a result, the plurality of optical fiber ribbons 7 are assembled in a state where their stacked state has been disrupted. In this way, in the one or more embodiments, the optical fiber unit 2 can be constructed in a state where the stacked state of the plurality of optical fiber ribbons 7 has been disrupted, as illustrated in FIG. 4B.

Figure 5:
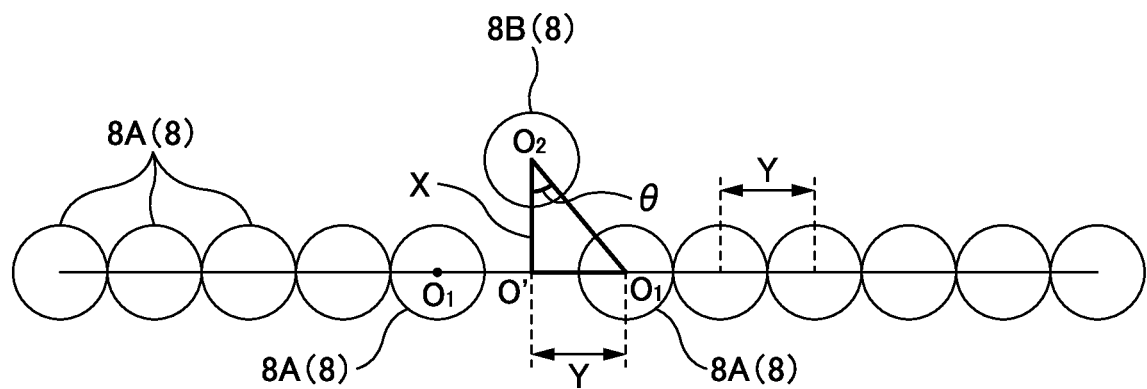
FIG. 5 is an explanatory diagram of a deformation amount X of a second optical fiber 8B.

Fiber Length Difference:

FIG. 5 is an explanatory diagram of a deformation amount X of the second optical fiber 8B. FIG. 5 is an explanatory diagram of a cross section of an optical fiber ribbon 7 at a non-connected part 9B of the second optical fiber 8B.

The second optical fiber 8B is longer than the first optical fibers 8A, and hence, at a non-connected part 9B of the second optical fiber 8B, the second optical fiber deforms so as to rise up with respect to the adjacent first optical fibers 8A. In FIG. 5, O2 is the center of the second optical fiber 8B, O1 is the center of the first optical fiber 8A adjacent to the second optical fiber 8B, and O' is the midpoint between the respective centers O1 of the two first optical fibers 8A adjacent to the second optical fiber 8B. Midpoint O' also corresponds to the position of the center of the second optical fiber 8B in a cross section taken at a position where the connection part 9A for connecting the second optical fiber 8B is formed. The midpoint O' also corresponds to the intersection point between a line extended in the ribbon width direction from the center O1 and a line extended in the ribbon thickness direction from the center O2. The distance between the center O2 and the midpoint O', as illustrated in the figure, is defined as deformation amount X (mm). The interval between the optical fibers 8 in the ribbon width direction is defined as fiber pitch Y (mm). The distance between the midpoint O' and the center O1, as illustrated in the figure, is also equivalent to the fiber pitch Y. Further, as illustrated in the figure, the angle formed between a line connecting the midpoint O' and the center O2 and a line connecting the center O1 and the center O2 (i.e., angle O'-O2-O1) is $\theta$ (degrees).

In the one or more embodiments, the second optical fiber 8B rising up from the ribbon surface disrupts the posture of the other optical fiber ribbons 7 (not illustrated; optical fiber ribbons stacked above the optical fiber ribbon illustrated in FIG. 5), and as a result, the plurality of optical fiber ribbons 7 are assembled in a state where their stacked state has been disrupted. In order for the second optical fiber 8B to be able to disrupt the posture of another optical fiber ribbon 7, it is necessary that the second optical fiber 8B protrudes out by at least an amount worth one optical fiber. Stated differently, in order for the second optical fiber 8B to be able to disrupt the posture of another optical fiber ribbon 7, it is necessary that the deformation amount X of the second optical fiber 8B is greater than the fiber pitch Y. (In other words, it is necessary that the angle $\theta$ is less than 45 degrees.) Conditions for establishing X>Y will be investigated below.

Figure 6:
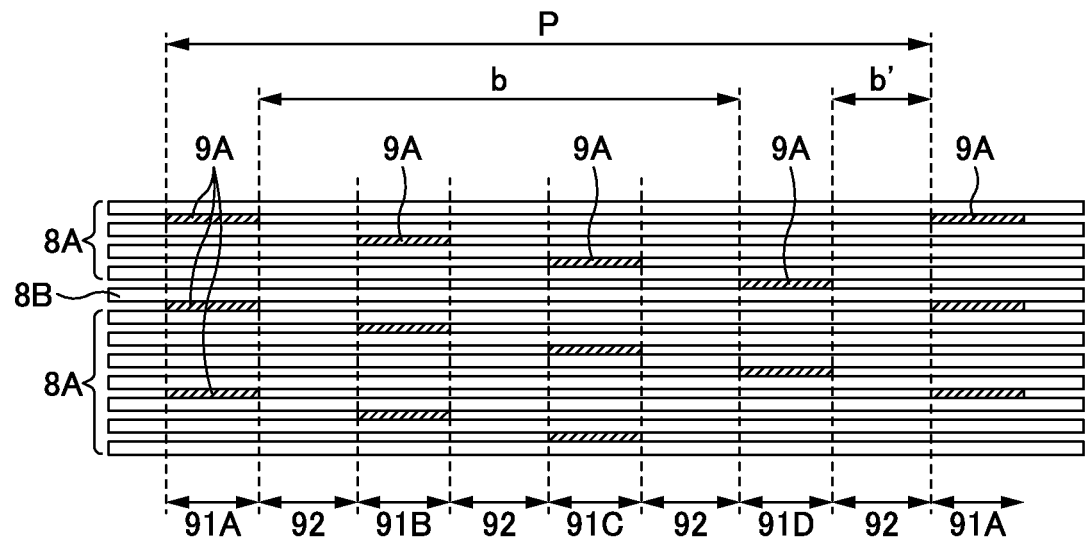
FIG. 6 is a top view of an example of an intermittently-connected optical fiber ribbon 7.

FIG. 6 is a top view of an example of an intermittently-connected optical fiber ribbon 7.

In the intermittently-connected optical fiber ribbon 7, a plurality of connection parts 9A are formed periodically in the length direction at a predetermined repetitive pitch P. Within the range of a single period of pitch P, all the optical fibers 8 (including the first optical fibers 8A and the second optical fiber 8B) are connected by the connection parts 9A. Within the range of a single period of pitch P, there are connected zones 91 (91A to 91D) and non-connected zones 92. The "connected zone 91" is a zone where the connection parts 9A exist. The "non-connected zone 92" is a zone where no connection part 9A exists. In this example, four connected zones 91 (91A to 91D) and four non-connected zones 92 are formed alternately in the length direction within the range of a single period of pitch P. Note, however, that the number of connected zones 91 and non-connected zones 92 is not limited thereto, as will be described in detail below. In this example, each connected zone 91 includes two to three connection parts 9A in the ribbon width direction. Note, however, that the number of connection parts 9A in each connected zone 91 is not limited thereto, as will be described in detail below. In this example, as illustrated in FIG. 6, the four connected zones 91 within the range of a single period of pitch P are referred to respectively as first connected zone 91A, second connected zone 91B, third connected zone 91C, and fourth connected zone 91D, in order from the left.

The second optical fiber 8B illustrated in FIG. 6 is connected to the adjacent first optical fibers 8A by the connection part 9A in the first connected zone 91A and the connection part 9A in the fourth connected zone 91D. Stated differently, due to the non-connected part 9B between the connection part 9A in the first connected zone 91A and the connection part 9A in the fourth connected zone 91D, the second optical fiber 8B is not bound to the first optical fibers 8A, and can thus deform in the ribbon thickness direction (i.e., direction perpendicular to the ribbon surface) with respect to the first optical fibers 8A. Herein, the interval, in the length direction, between the connection parts 9A that connect the first optical fibers 8A and the second optical fiber 8B is defined as b (mm), as a value indicating the length of a region in which the second optical fiber 8B can deform with respect to the first optical fibers 8A. In this example, as illustrated in FIG. 6, the interval, in the length direction, between the connection part 9A in the first connected zone 91A and the connection part 9A in the fourth connected zone 91D is the length b (mm). It should be noted that, also in the region indicated by length b' in the figure, the second optical fiber 8B is not bound to the first optical fibers 8A; however, in cases where there are two or more types of intervals, in the length direction, between connection parts 9A that connect the first optical fibers 8A and the second optical fiber 8B, the length b is defined based on the longest interval. It should be noted that, as illustrated in FIG. 6, the region having the length b may span a plurality of connected zones 91 (in this example, the second connected zone 91B and the third connected zone 91C).

Figure 7A:
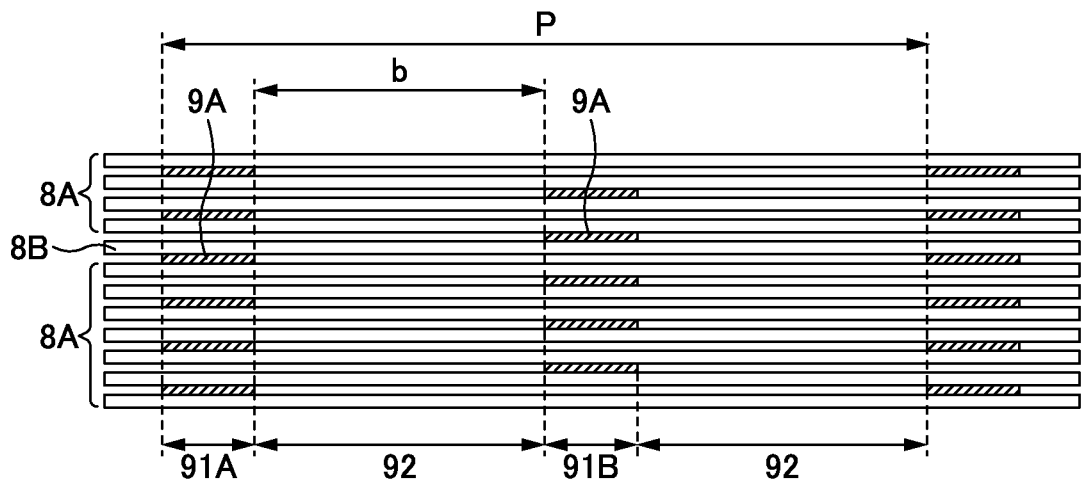
FIGS. 7A to 7C are top views of other examples of intermittently-connected optical fiber ribbons 7.
Figure 7B:
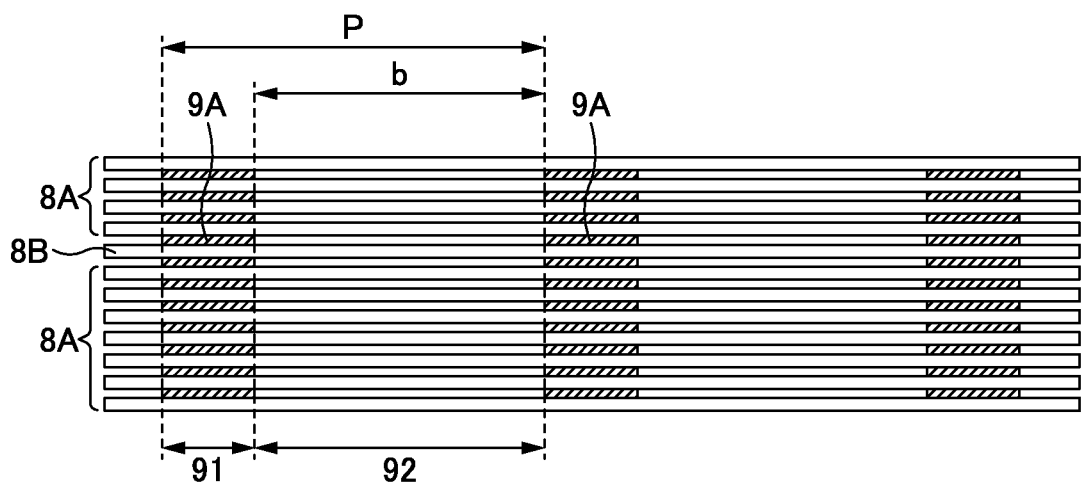
Figure 7C:
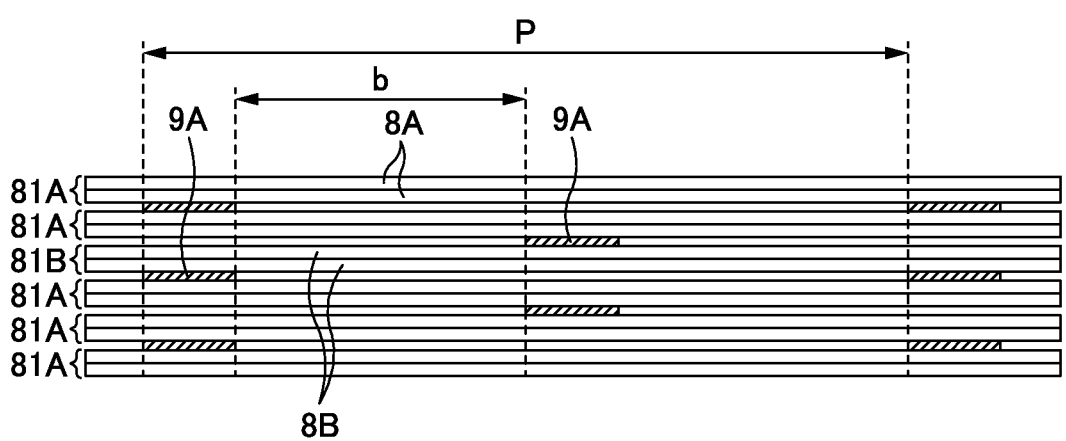

FIGS. 7A to 7C are top views of other examples of intermittently-connected optical fiber ribbons 7.

In the intermittently-connected optical fiber ribbon 7 illustrated in FIG. 7A, there are two connected zones 91 (first connected zone 91A and second connected zone 91B) and two non-connected zones 92 formed alternately in the length direction within the range of a single period of pitch P. The plurality of connection parts 9A in the first connected zone 91A and the plurality of connection parts 9A in the second connected zone 91B are arranged in a staggered configuration in the ribbon width direction. As described here, the number of connected zones 91 (or non-connected zones 92) within the range of a single period of pitch P is not limited to four, and there may be two zones, or other number of zones (e.g., three zones).

In the intermittently-connected optical fiber ribbon 7 illustrated in FIG. 7B, there is one connected zone 91 (and one non-connected zone 92) formed within the range of a single period of pitch P. As described here, the number of connected zones 91 (or non-connected zones 92) within the range of a single period of pitch P is not limited to the plural, and there may be only one zone.

The intermittently-connected optical fiber ribbon 7 illustrated in FIG. 7C includes a plurality (in this example, six pairs) of pairs of duplex optical fibers 8 (i.e., fiber pairs 81), in each of which two optical fibers are connected continuously in the length direction. Adjacent fiber pairs are connected intermittently by the connection parts 9A. In this example, the intermittently-connected optical fiber ribbon 7 includes five fiber pairs 81A of first optical fibers 8A, and one fiber pair 81B of a pair of second optical fibers 8B. As described here, duplex fiber pairs 81 may be connected intermittently, to form an intermittently-connected optical fiber ribbon 7.

In each of the intermittently-connected optical fiber ribbons 7 illustrated in FIGS. 7A to 7C, the interval b (mm), in the length direction, between the connection parts 9A that connect the first optical fibers 8A and the second optical fiber 8B is a value indicating the length of the region as illustrated in each figure. It should be noted that, in the case of the intermittently-connected optical fiber ribbon 7 illustrated in FIG. 7C, one second optical fiber 8B is connected indirectly to the first optical fiber 8A via the other second optical fiber 8B constituting the fiber pair; hence, the interval b (mm), in the length direction, between the connection parts 9A that connect the first optical fibers 8A and the second optical fibers 8B is defined as illustrated in FIG. 7C. It should also be noted that the deformation amount X, as illustrated in FIG. 5, becomes the greatest at the midpoint of the region indicated by the interval b (mm), in the length direction, between the connection parts 9A that connect the first optical fibers 8A and the second optical fiber 8B.

Next, the fiber length difference between the second optical fiber 8B and the first optical fiber 8A is defined as c (%). Herein, the second optical fiber 8B is longer than the first optical fiber 8A, so "fiber length difference c (%)" means that the second optical fiber 8B is longer than the first optical fiber 8A by c %. For example, let us assume a case where the intermittently-connected optical fiber ribbon 7 is cut to a predetermined length and then separated individually into single fibers, and the length of the first optical fiber 8A is L1 and the length of the second optical fiber 8B is L2. In this case, the fiber length difference c (%) can be expressed according to the following equation.

$$c(\%) = 100 \times (L2 - L1)/L1$$

As described above, where b is the interval, in the length direction, between the connection parts 9A that connect the first optical fiber 8A and the second optical fiber 8B and where c (%) is the fiber length difference of the second optical fiber 8B with respect to the first optical fiber 8A, the deformation amount X of the second optical fiber 8B at the midpoint of the region with length b can be expressed according to the following equation, based on the length b and the fiber length difference c.

[Math. 1]

$$X = \frac{b}{2}\sqrt{(1 + 0.01 \times c)^2 - 1}$$

$$\tan\theta = \frac{Y}{X}$$

In order for the second optical fiber 8B to disrupt the posture of another optical fiber ribbon 7, the deformation amount X (see FIG. 5) of the second optical fiber 8B needs to be greater than the fiber pitch Y (X>Y), and the angle θ (see FIG. 5) needs to be less than 45 degrees. Hence, the condition for the second optical fiber 8B to disrupt the posture of another optical fiber ribbon 7 can be expressed as follows.

[Math. 2]

$$Y < \frac{b}{2}\sqrt{(1 + 0.01 \times c)^2 - 1}$$

Based on [Math. 2] above, the conditions to be satisfied by interval b and fiber length difference c such that X becomes greater than Y (X>Y) can be derived as follows.

[Math. 3]

$$b > \frac{2Y}{\sqrt{(1 + 0.01 \times c)^2 - 1}}$$

[Math. 4]

$$c > 100 \times \left\{\sqrt{\left(\frac{2Y}{b}\right)^2 + 1} - 1\right\}$$

Incidentally, the greater the fiber length difference c becomes, the more the transmission loss of the second optical fiber 8B increases due to fiber length difference, thereby giving rise to an increase in the optical cable's maximum transmission loss.

Figure 8:
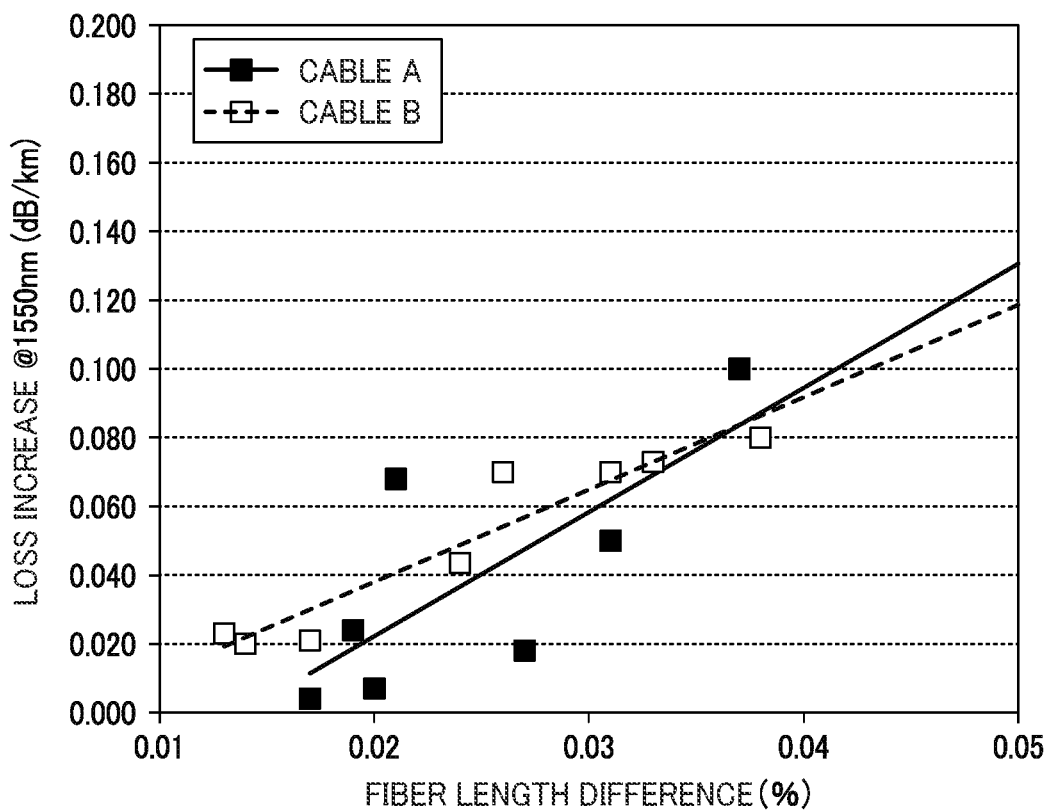
FIG. 8 is a graph showing a relationship between fiber length difference c and optical cable transmission loss.

FIG. 8 is a graph showing a relationship between fiber length difference c and optical cable transmission loss. In this example, 1728-fiber optical cables (cables A) and 3456-fiber optical cables (cables B), each having the configuration illustrated in FIG. 1A, were prepared. The optical cables were produced so as to have varied fiber length differences c. These cables were subjected to loss-temperature characteristic evaluation with a cycle ranging from −30° C. to +70° C., and at a measurement wavelength of 1550 nm, the loss increase (i.e., difference between the transmission loss in the initial state and the maximum transmission loss in the temperature characteristic test) was measured. Whereas the GR-20 standard stipulates that the loss increase should be equal to or less than 0.15 dB/km, when the fiber length difference c is 0.05%, the loss increase is within the range of loss increase stipulated by GR-20, as shown in the graph in the figure. Hence, the fiber length difference c may be less than 0.05% (c<0.05).

So, as described above, where b is the interval, in the length direction, between the connection parts 9A that connect the first optical fiber 8A and the second optical fiber 8B, c (%) is the fiber length difference of the second optical fiber 8B with respect to the first optical fiber 8A, and Y is the interval (fiber pitch) between the optical fibers 8 in the ribbon width direction, the fiber length difference c may satisfy the aforementioned conditional expression of [Math. 4] and also satisfies c<0.05. In this way, the second optical fiber 8B can disrupt the posture of another optical fiber ribbon 7, and thus the plurality of optical fiber ribbons 7 can be assembled in a state where their stacked state has been disrupted, and as a result, it is possible to suppress load from concentrating on certain optical fibers 8.

It should be noted that, in the one or more embodiments, the second optical fiber 8B rising up from the ribbon surface disrupts the posture of the other optical fiber ribbons 7, as described above. Hence, the second optical fiber 8B may not located at the end in the ribbon width direction, but is located more inward than the ends in the ribbon width direction.

FIG. 9A is a table showing a relationship between the length b and the fiber length difference c when the fiber pitch Y is 0.25 mm. Typically, the fiber pitch Y of an optical fiber ribbon 7 is 0.25 mm. As shown in the table, when the fiber pitch Y is 0.25 mm, the interval b, in the length direction, between the connection parts 9A that connect the first optical fiber 8A and the second optical fiber 8B needs to be greater than 15.8 mm. (If the length b is equal to or less than 15.8 mm, one or both of the aforementioned conditional expression of [Math. 4] and/or c<0.05 cannot be satisfied.)

FIG. 9B is a table showing a relationship between the length b and the fiber length difference c when the fiber pitch Y is 0.20 mm. As shown in the table, when the fiber pitch Y is 0.20 mm, the interval b, in the length direction, between the connection parts 9A that connect the first optical fiber 8A and the second optical fiber 8B needs to be greater than 12.7 mm.

Figure 10A:
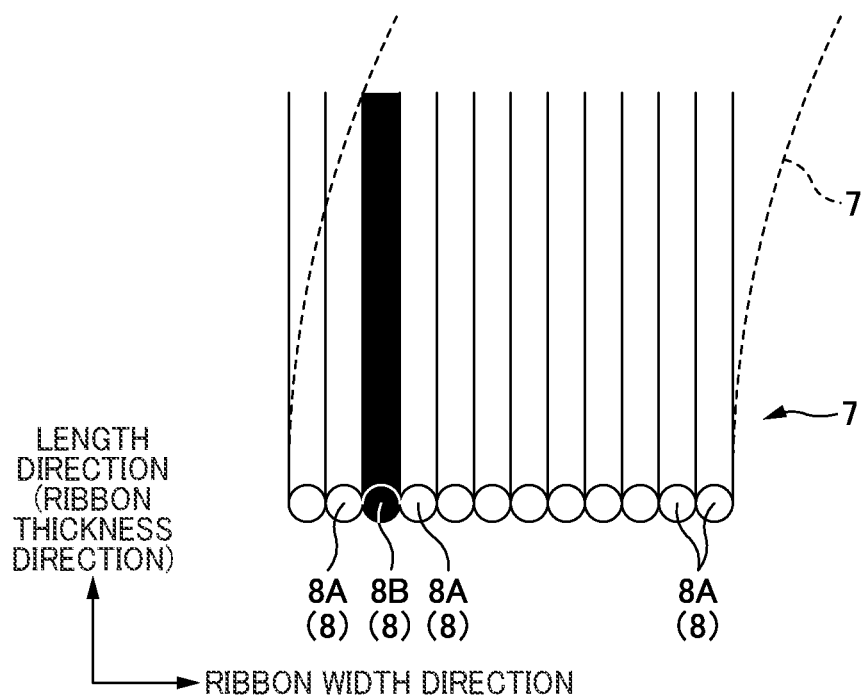
FIG. 10A is an explanatory diagram illustrating an arrangement of a second optical fiber 8B and bending of an optical fiber ribbon 7.

FIG. 10A is an explanatory diagram illustrating an arrangement of a second optical fiber 8B and bending of an optical fiber ribbon 7. The optical fibers whose cross section is illustrated as a white (empty) circle are first optical fibers 8A. The optical fiber whose cross section is illustrated as a black (solid) circle is the second optical fiber 8B, which is longer than the first optical fibers 8A.

In cases where the second optical fiber 8B is disposed asymmetrically with respect to the ribbon width direction of the optical fiber ribbon 7, the optical fiber ribbon 7 will bend due to the fiber length difference of the second optical fiber 8B. For example, as illustrated in FIG. 10A, in cases where the second optical fiber 8B is disposed asymmetrically such that it is located more toward the left side within the optical fiber ribbon 7, the optical fiber ribbon 7 has a tendency to bend in a manner that the left-side surface of the optical fiber ribbon 7 protrudes convexly, as illustrated by the dotted lines in the figure. When this optical fiber ribbon 7—which has a tendency to bend as described above—is bundled together with other optical fiber ribbons 7 by bundling members 10, the optical fiber ribbon 7 having the tendency to bend will be straightened along the length direction, thus causing the ribbon surface of the optical fiber ribbon 7 to deform undulatingly. As a result, the plurality of optical fiber ribbons 7 can be easily assembled in a state where their stacked state has been disrupted. Hence, the second optical fiber 8B may be disposed asymmetrically with respect to the ribbon width direction of the optical fiber ribbon 7.

Figure 10B:
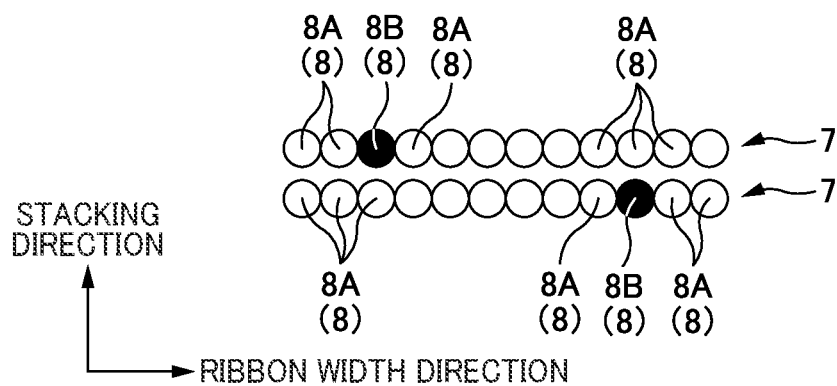
FIG. 10B is an explanatory diagram viewed from the length direction, illustrating how two optical fiber ribbons, each including a second optical fiber 8B disposed asymmetrically, are disposed with respective ribbon surfaces facing one another.

FIG. 10B is an explanatory diagram which is a length-direction view of two optical fiber ribbons 7, each including a second optical fiber 8B disposed asymmetrically. At the time of assembling two optical fiber ribbons 7 with respective ribbon surfaces facing one another, it is possible to make the position, in the ribbon width direction, of the second optical fiber 8B in one optical fiber ribbon 7 different from the position, in the ribbon width direction, of the second optical fiber 8B in the other optical fiber ribbon 7. For example, as illustrated in FIG. 10B, the optical fiber ribbon 7 in which the second optical fiber 8B may be disposed asymmetrically in a manner biased toward the left side and the optical fiber ribbon 7 in which the second optical fiber 8B may be disposed asymmetrically in a manner biased toward the right side are assembled with their respective ribbon surfaces facing one another. In this way, when such optical fiber ribbons 7, which have tendencies to bend in opposite directions, are bundled by bundling members 10, the respective ribbon surfaces of the two optical fiber ribbons 7 will deform so as to undulate in opposite directions, thus further facilitating the assembling of optical fiber ribbons 7 in a state where their stacked state has been disrupted.

SUPPLEMENTARY EXPLANATION

Method for Measuring Fiber Length Difference c:

In the description above, the fiber length difference of the second optical fiber 8B with respect to the first optical fiber 8A is found as c (%)=100×(L2−L1)/L1, by cutting the intermittently-connected optical fiber ribbon 7 to a predetermined length and separating the ribbon individually into single fibers, wherein the length of the first optical fiber 8A is defined as L1 and the length of the second optical fiber 8B is defined as L2. In cases of measuring the fiber length difference c (%) in this way, first, the optical fiber ribbon 7 is cut to a given length α (mm) and then the connection parts 9A of the optical fiber ribbon 7 which has been cut are separated, and thereby the plurality of optical fibers 8 constituting the optical fiber ribbon 7 are separated individually. Then, the length β (mm) of each separated optical fiber 8 is measured. In cases where the optical fiber ribbon 7 is constituted by N pieces of optical fibers 8, the length of the i-th optical fiber 8 (i=1, 2, . . . N) is expressed as $β_i$. In cases where the m-th optical fiber is the first optical fiber 8A and the n-th (n=m−1 or n=m+1) optical fiber is the second optical fiber 8B, the fiber length difference c (%) can be found as c (%)=100×($β_n$−$β_m$)/$β_m$.

With this type of measurement method, in order to measure the fiber length difference c (%) accurately, it is possible that the length α (mm), to which the optical fiber ribbon 7 is cut to measure the fiber length difference c (%), is longer. Further, as described above, since the fiber length difference c of the one or more embodiments is less than 0.05%, it is possible that the fiber length difference c (%) can be measured accurately to the second decimal place. If, for example, the optical fiber ribbon 7 is cut to a length of 10 m or greater, the fiber length difference c (%) can be measured to the second decimal place by measuring the length β (mm) of each individually-separated optical fiber 8 to the order of 1 mm. Hence, it is possible that the length α (mm), to which the optical fiber ribbon 7 is cut to measure the fiber length difference c (%), is 10 m or greater.

Further, when cutting the optical fiber ribbon 7 to a given length α (mm), it is necessary that a range worth at least a single period of pitch P (mm) is included in the cut-out optical fiber ribbon 7. Hence, it is possible that the length α (mm), to which the optical fiber ribbon 7 is cut to measure the fiber length difference c (%), is more than twice the pitch P (mm). That is, it is possible that α>2×P.

The aforementioned measurement method, however, finds an average fiber length difference within the length α (mm); hence, the fiber length difference c (%) is found indirectly in a region wherein the second optical fiber 8B can deform with respect to the first optical fiber 8A (i.e., the region wherein the second optical fiber 8B is not bound to the first optical fiber 8A; the region corresponding to length b in FIG. 6). Note, however, that the method for measuring the fiber length difference c (%) is not limited thereto. For example, the lengths of the first optical fiber 8A and the second optical fiber 8B may be measured directly within a region wherein the second optical fiber 8B can deform with respect to the first optical fiber 8A (i.e., within the region corresponding to length b in FIG. 6), and the fiber length difference may be found as c (%)=100×(L2−L1)/L1 by defining the length of the first optical fiber 8A within this region as L1 and the length of the second optical fiber 8B within this region as L2. In this way, it is possible to directly find the fiber length difference c (%) within a region wherein the second optical fiber 8B can deform with respect to the first optical fiber 8A (i.e., the region corresponding to length b in FIG. 6).

Method for Measuring Fiber Pitch Y:

An example of a method for measuring fiber pitch Y may be as follows. First, an end of an intermittently-connected optical fiber ribbon 7 is fixed and a weight of around 100 g is attached to the other end thereof, so that tension is applied to the optical fiber ribbon 7. Then, in this state where tension is applied to the optical fiber ribbon 7, an image of the ribbon surface is captured with a camera from a direction perpendicular to the ribbon surface. In the captured image of the optical fiber ribbon 7, a plurality of optical fibers 8 constituting the optical fiber ribbon 7 are lined up in parallel along the length direction. So, the interval (i.e., the interval in the ribbon width direction) between respective cores of the optical fibers in the captured image of the optical fiber ribbon 7 is measured as fiber pitch Y. Note, however, that the method for measuring the fiber pitch Y is not limited to the above.

Method for Measuring Length b:

An example of a method for measuring the length b (see FIG. 6 and FIGS. 7A to 7C) of a region wherein the second optical fiber 8B can deform with respect to the first optical fiber 8A may be as follows. First, an end of an intermittently-connected optical fiber ribbon 7 is fixed and a weight of around 100 g is attached to the other end thereof, so that tension is applied to the optical fiber ribbon 7. Then, in this state where tension is applied to the optical fiber ribbon 7, an image of the ribbon surface is captured with a camera from a direction perpendicular to the ribbon surface. It should be noted that, at the time of measuring the length b, it is possible to place the optical fiber ribbon 7 on a stage when capturing an image of the optical fiber ribbon 7 in a state where tension is applied to the optical fiber ribbon 7. In the captured image of the optical fiber ribbon 7, a plurality of optical fibers 8 constituting the optical fiber ribbon 7 are lined up in parallel along the length direction. So, in the captured image of the optical fiber ribbon 7, the interval between the respective inner-side edge parts of two connection parts 9A that connect the first optical fibers 8A and the second optical fiber 8B (i.e., the interval between the connection parts 9A in the length direction) is measured as the aforementioned length b. It should be noted that, in cases where there are two or more types of intervals, in the length direction, between connection parts 9A that connect the first optical fibers 8A and the second optical fiber 8B as illustrated in FIG. 6, the longest interval is measured, and not the shorter interval b' as illustrated in the figure, and that measurement result is found as the length b.

First Optical Fiber 8A and Second Optical Fiber 8B:

In the optical fiber ribbon 7 illustrated in FIG. 2B, the optical fibers other than the second optical fiber 8B all have the same length as the first optical fiber 8A. Note, however, that the lengths of the plurality of optical fibers constituting the optical fiber ribbon 7 may be different from one another.

In cases where there are variations in the lengths of the optical fibers constituting the optical fiber ribbon 7, it will suffice if, in at least two optical fibers adjacent to one another among the plurality of optical fibers constituting the optical fiber ribbon 7—with the shorter optical fiber defined as the first optical fiber 8A and the longer optical fiber (the optical fiber adjacent to the first optical fiber 8A) defined as the second optical fiber 8B—the fiber length difference c (%) of the second optical fiber 8B with respect to the first optical fiber 8A satisfies the aforementioned conditions for the fiber length difference c (i.e., the conditional expression of [Math. 4] and c<0.05). Further, the number of second optical fibers 8B satisfying the aforementioned conditions for the fiber length difference c (i.e., the conditional expression of [Math. 4] and c<0.05) is not limited to one, and there may be two or more such second optical fibers.

Figure 11:
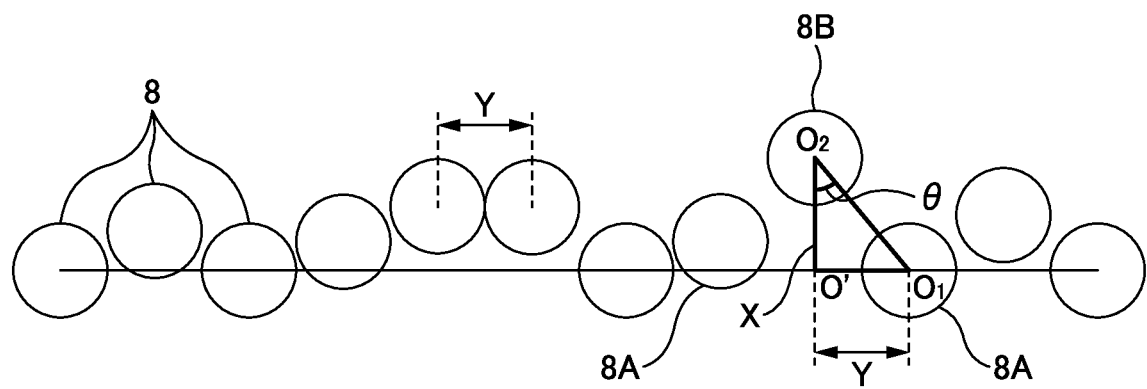
FIG. 11 is an explanatory diagram of a deformation amount X of a second optical fiber 8B in a case where there are variations in the lengths of the optical fibers 8.

FIG. 11 is an explanatory diagram of a deformation amount X of a second optical fiber 8B in a case where there are variations in the lengths of the optical fibers 8. FIG. 11 is an explanatory diagram of a cross section of an optical fiber ribbon 7 at a non-connected part 9B of the second optical fiber 8B.

In cases where the fiber length difference c satisfies the aforementioned conditions (i.e., the conditional expression of [Math. 4] and c<0.05), the deformation amount X of the second optical fiber 8B with respect to first optical fiber 8A is greater than the fiber pitch Y (stated differently, the angle θ in the figure is less than 45 degrees). Hence, in cases where the fiber length difference c satisfies the aforementioned conditions (i.e., the conditional expression of [Math. 4] and c<0.05), the second optical fiber 8B protrudes out by at least an amount worth one optical fiber with respect to the first optical fiber 8A. Thus, the second optical fiber 8B rising up from the ribbon surface can disrupt the posture of the other optical fiber ribbons 7 (not illustrated; optical fiber ribbons stacked above the optical fiber ribbon illustrated in FIG. 11), and as a result, the plurality of optical fiber ribbons 7 can be assembled in a state where their stacked state has been disrupted.

In FIG. 11, O2 is the center of the second optical fiber 8B, O1 is the center of the first optical fiber 8A adjacent to the second optical fiber 8B on the right side thereof in the figure, and point O' is the intersection point between a line extended in the ribbon width direction from the center O1 and a line extended in the ribbon thickness direction from the center O2. As described above, in the one or more embodiments, when the angle formed between a line connecting the point O' and the center O2 and a line connecting the center O1 and the center O2 (angle O'-O2-O1) is defined as A (degrees), the angle A is less than 45 degrees. In this way, the second optical fiber 8B protrudes out with respect to the first optical fiber 8A (i.e., the optical fiber adjacent to the second optical fiber 8B on the right side thereof) by at least an amount worth one optical fiber.

Further, in the one or more embodiments, also in a case where the first optical fiber 8A is an optical fiber adjacent to the second optical fiber 8B on the left side thereof in the figure, the first optical fiber's center is O1, and the angle O'-O2-O1 is A (degrees), it is possible that the angle A is less than 45 degrees. Stated differently, it is possible that, both in cases where the first optical fiber 8A is an optical fiber 8 adjacent to the second optical fiber 2B on one side and where the first optical fiber 8A is an optical fiber 8 adjacent to the second optical fiber on the other side, the fiber length difference c of the second optical fiber 8B with respect to the first optical fiber 8A satisfies the aforementioned conditions (i.e., the conditional expression of [Math. 4] and c<0.05). In this way, the second optical fiber 8B will protrude out by at least an amount worth one optical fiber with respect to the optical fibers 8 (the first optical fibers 8A) adjacent thereto on both sides. Thus, the second optical fiber 8B can disrupt the posture of the other optical fiber ribbons 7 (not illustrated; optical fiber ribbons stacked above the optical fiber ribbon illustrated in FIG. 11) even more easily.

OTHER EMBODIMENTS

Although the disclosure has been described with respect to only a limited number of embodiments, those skilled in the art, having benefit of this disclosure, will appreciate that various other embodiments may be devised without departing from the scope of the present invention. The foregoing embodiments are for facilitating the understanding of the present disclosure, and are not to be construed as limiting the present disclosure. The present disclosure may be modified and/or improved without departing from the gist thereof, and it goes without saying that the present disclosure encompasses equivalents thereof. Further, the various embodiments described above may be employed in combination, as appropriate. Accordingly, the scope of the invention should be limited only by the attached claims.

REFERENCE SIGNS LIST

1: Optical cable;
2: Optical fiber unit;
3: Outer sheath;
4: Tension member;
5: Wrapping tape;
7: Optical fiber ribbon;
8: Optical fiber;
8A: First optical fiber;
8B: Second optical fiber;
9A: Connection part;
9B: Non-connected part;
91: Connected zone;
92: Non-connected zone;
10: Bundling member;
15: Joining part;
20: Unit manufacturing device;
30: Ribbon supplying part;
40: Assembling part;
50: Bundling member attachment part;
60: Bundling member joining part;
100: Unit forming part.

The invention claimed is:
1. An optical fiber unit comprising:
intermittently-connected optical fiber ribbons, wherein:
at least one of the intermittently-connected optical fiber ribbons comprises optical fibers including:
a first optical fiber, and
a second optical fiber that is longer than the first optical fiber;
the second optical fiber deforms in a thickness direction of the intermittently-connected optical fiber ribbons with respect to the first optical fiber, and
the following conditions are satisfied:

$$C > 100 \times \left\{ \sqrt{\left(\frac{2Y}{b}\right)^2 + 1} - 1 \right\}$$

and
c<0.05, where
b is an interval, in a length direction, between connection parts that connect the first optical fiber and the second optical fiber,
c (%) is a fiber length difference of the second optical fiber with respect to the first optical fiber, and
Y is an interval between the optical fibers in a ribbon width direction.

2. The optical fiber unit according to claim 1, further comprising a bundling member that bundles the intermittently-connected optical fiber ribbons.

3. The optical fiber unit according to claim 1, wherein the second optical fiber is disposed asymmetrically with respect to the ribbon width direction of the intermittently-connected optical fiber ribbons.

4. The optical fiber unit according to claim 3, wherein:
a first optical fiber ribbon and a second optical fiber ribbon are disposed with respective ribbon surfaces facing one another; and
when viewing the first optical fiber ribbon and the second optical fiber ribbon from the length direction, a position, in the ribbon width direction, of said second optical fiber in the first optical fiber ribbon is different from a position, in the ribbon width direction, of said second optical fiber in the second optical fiber ribbon.

5. An optical fiber unit manufacturing method comprising:
preparing an intermittently-connected optical fiber ribbon comprising optical fibers, including: a first optical fiber and a second optical fiber that is longer than the first optical fiber, wherein
the second optical fiber deforms in a thickness direction of the intermittently-connected optical fiber ribbons with respect to the first optical fiber, and
the following conditions are satisfied:

$$C > 100 \times \left\{ \sqrt{\left(\frac{2Y}{b}\right)^2 + 1} - 1 \right\}$$

and
c<0.05, where
b is an interval, in a length direction, between connection parts that connect the first optical fiber and the second optical fiber,
c (%) is a fiber length difference of the second optical fiber with respect to the first optical fiber, and
Y is an interval between the optical fibers in a ribbon width direction; and
assembling intermittently-connected optical fiber ribbons including said intermittently-connected optical fiber ribbon including said second optical fiber.

* * * * *